United States Patent
Williams

(10) Patent No.: US 9,063,923 B2
(45) Date of Patent: Jun. 23, 2015

(54) METHOD FOR IDENTIFYING THE INTEGRITY OF INFORMATION

(75) Inventor: Frank John Williams, Los Alamitos, CA (US)

(73) Assignee: IQINTELL, INC., Huntington Beach, CA (US)

( * ) Notice: Subject to any disclaimer, the term of this patent is extended or adjusted under 35 U.S.C. 154(b) by 1083 days.

(21) Appl. No.: 12/661,612

(22) Filed: Mar. 18, 2010

(65) Prior Publication Data

US 2010/0241419 A1 Sep. 23, 2010

Related U.S. Application Data

(60) Provisional application No. 61/210,396, filed on Mar. 18, 2009.

(51) Int. Cl.
*G06F 17/27* (2006.01)
*G06F 17/21* (2006.01)
*G10L 21/00* (2013.01)

(52) U.S. Cl.
CPC .................................. *G06F 17/27* (2013.01)

(58) Field of Classification Search
USPC ............................ 704/9, 10, 270, 270.1, 275
See application file for complete search history.

(56) References Cited

U.S. PATENT DOCUMENTS

| | | | | |
|---|---|---|---|---|
| 6,405,162 | B1 * | 6/2002 | Segond et al. ................. | 704/9 |
| 6,675,159 | B1 * | 1/2004 | Lin et al. ...................... | 1/1 |
| 7,403,890 | B2 * | 7/2008 | Roushar ........................ | 704/9 |
| 7,512,596 | B2 * | 3/2009 | Hajela et al. ................. | 1/1 |
| 7,539,619 | B1 * | 5/2009 | Seligman et al. ............. | 704/277 |
| 7,860,706 | B2 * | 12/2010 | Abir ............................. | 704/4 |
| 2001/0014902 | A1 * | 8/2001 | Hu et al. ....................... | 707/540 |
| 2003/0216919 | A1 * | 11/2003 | Roushar ........................ | 704/260 |
| 2007/0214125 | A1 | 9/2007 | Williams | |
| 2007/0214199 | A1 | 9/2007 | Williams | |
| 2007/0266009 | A1 | 11/2007 | Williams | |
| 2007/0299831 | A1 | 12/2007 | Williams | |
| 2008/0071737 | A1 | 3/2008 | Williams | |
| 2008/0082511 | A1 | 4/2008 | Williams | |
| 2008/0091411 | A1 | 4/2008 | Williams | |
| 2008/0109416 | A1 | 5/2008 | Williams | |
| 2008/0140634 | A1 | 6/2008 | Williams | |

(Continued)

OTHER PUBLICATIONS

Tolk, A., Diallo, S., & Turnitsa, C. (Sep. 2006). Merging protocols, grammar, representation, and ontological approaches in support of C-BML. In 2006 Fall Simulation Interoperability Workshop.*

(Continued)

*Primary Examiner* — Edgar Guerra-Erazo
(74) *Attorney, Agent, or Firm* — Gregory B. Gulliver; Apogee Law Group P.C.

(57) ABSTRACT

A preferred method for identifying at least one of a grammatical, linguistic and/or conceptual integrity of a data corpus is disclosed. In a preferred method, the associations between several word elements of a data corpus are identified. Then, the word elements experiencing several associations are used for identifying the continuum between associations and the number of word elements involved and/or not involved in the associations which is then used for identifying at least one of a: linguistic, semantic, grammatical, conceptual or other integrity or coherence of the analyzed data corpus, such as a query for optionally displaying a data corpus understanding and/or selecting a particular search behavior or other.

8 Claims, 13 Drawing Sheets

(56) References Cited

U.S. PATENT DOCUMENTS

| | | |
|---|---|---|
| 2008/0140635 A1 | 6/2008 | Williams |
| 2008/0140649 A1 | 6/2008 | Williams |
| 2008/0275694 A1* | 11/2008 | Varone ............................... 704/9 |
| 2009/0089058 A1* | 4/2009 | Bellegarda .................... 704/251 |
| 2011/0301941 A1* | 12/2011 | De Vocht .......................... 704/9 |

OTHER PUBLICATIONS

Smith, J. B., Smith, D. K., & Kupstas, E. (1993). Automated protocol analysis. Human-Computer Interaction, 8(2), 101-145.*

* cited by examiner

METHOD FOR IDENTIFYING THE INTEGRITY OF INFORMATION

RELATED APPLICATIONS

This application claims the benefit of U.S. provisional patent application Ser. No. 61/210,396 filed 2009 Mar. 18 by the present inventor.

BACKGROUND

1. Field of Invention

The present invention relates generally to a method for identifying information. More particularly, a novel method for identifying the integrity of information forming at least one of a: single sentence, single phrase, multiple sentences, multiple phrase, information not forming a sentence and not forming a phrase.

2. Description of Related Art

The Revolution of the computer and the digital age are accountable for a series of inventions, communications and the transfer of knowledge including the storage of large amounts of valuable data upon which humanity sustains its progress. Many new scientific disciplines like Computational Linguistics and Natural Language Processing are born to study and understand some of the communication mediums such as natural languages. Regarded Intranets and Internet are built to distribute the valuable communication and knowledge to serve the specific information needs of millions of people every day. In particular, search engines are in charge of retrieving and delivering millions of documents to fulfill the specific needs of millions of people. However, current search technologies fail to effectively identify if a given data corpus such as a query is conceptually and/or grammatically coherent to enable the machine or engine the capacity to focus its search, behavior and therefore quality of data being retrieved. For example, a properly formed query such as "Mary ran quickly and cried" should only retrieve those websites discussing wherein "Mary" is the person who is "crying and running quickly;" however, another query such as "cry ran Mary" which does not form a proper sentence, should imply its search engine to behave or act appropriately or according to its query thus retrieving documents simply comprising the words "cry," "ran" and "Mary." As a result, the search engine, or other, can modify its behavior and/or search methodology to inherently and more intuitively match that its query or user.

In view of the present shortcomings, the present invention distinguishes over the prior art by providing heretofore a more compelling and effective method for identifying the conceptual and/or grammatical consistency of a data corpus such as a query to optionally manipulate the search behavior or protocols of a search engine and thus better match its user and/or query consistency while providing additional unknown, unsolved and unrecognized advantages as described in the following summary.

SUMMARY OF THE INVENTION

The present invention teaches certain benefits in use and construction which give rise to the objectives and advantages described below. The methods and systems embodied by the present invention overcome the limitations and shortcomings encountered when identifying and/or retrieving information. The method(s) permits, through the implementation of conceptual associations between word elements of a data corpus, such a CIRN, to identify the conceptual and/or grammatical coherence, integrity and consistency of said data corpus; which may optionally be used to select or choose a particular search behavior that better matches the consistency or integrity of said data corpus.

OBJECTS AND ADVANTAGES

A primary objective inherent in the above described methods of use is to provide several methods and systems to identify the conceptual consistency of a data corpus such as a query, thus allowing the method and systems to option to select or choose a search behavior to superiorly match the consistency of said data corpus not taught by the prior arts and further advantages and objectives not taught by the prior art. Accordingly, several objects and advantages of the invention are:

Another objective is to save user time by providing only conceptually matching data.

A further objective is to decrease the amount of effort implemented by users to select or modify a particular search behavior or methodology.

A further objective is to improve the quality and quantity of results.

A further objective is to permit machines and application the ability of handling natural language more efficiently.

A further objective is to permit machines and application the ability of identifying natural language more efficiently.

A further objective is to improve the ability of portable devices to manipulate natural language.

Another further objective is to encourage users to use natural language when interfacing with machines.

Another further objective is to allow search engines to behave more intuitively to the user's needs.

Other features and advantages of the described methods of use will become apparent from the following more detailed description, taken in conjunction with the accompanying drawings which illustrate, by way of example, the principles of the presently described apparatus and method of its use.

BRIEF DESCRIPTION OF THE DRAWINGS

The accompanying drawings illustrate examples of at least one of the best mode embodiments of the present method and methods of use. In such drawings.

DETAILED DESCRIPTION

The above described drawing figures illustrate the described methods and use in at least one of its preferred, best mode embodiment, which are further defined in detail in the following description. Those having ordinary skill in the art may be able to make alterations and modifications from what is described herein without departing from its spirit and scope. Therefore, it must be understood that what is illustrated is set forth only for the purposes of example and that it should not be taken as a limitation in the scope of the present system and method of use.

Figure 1A:
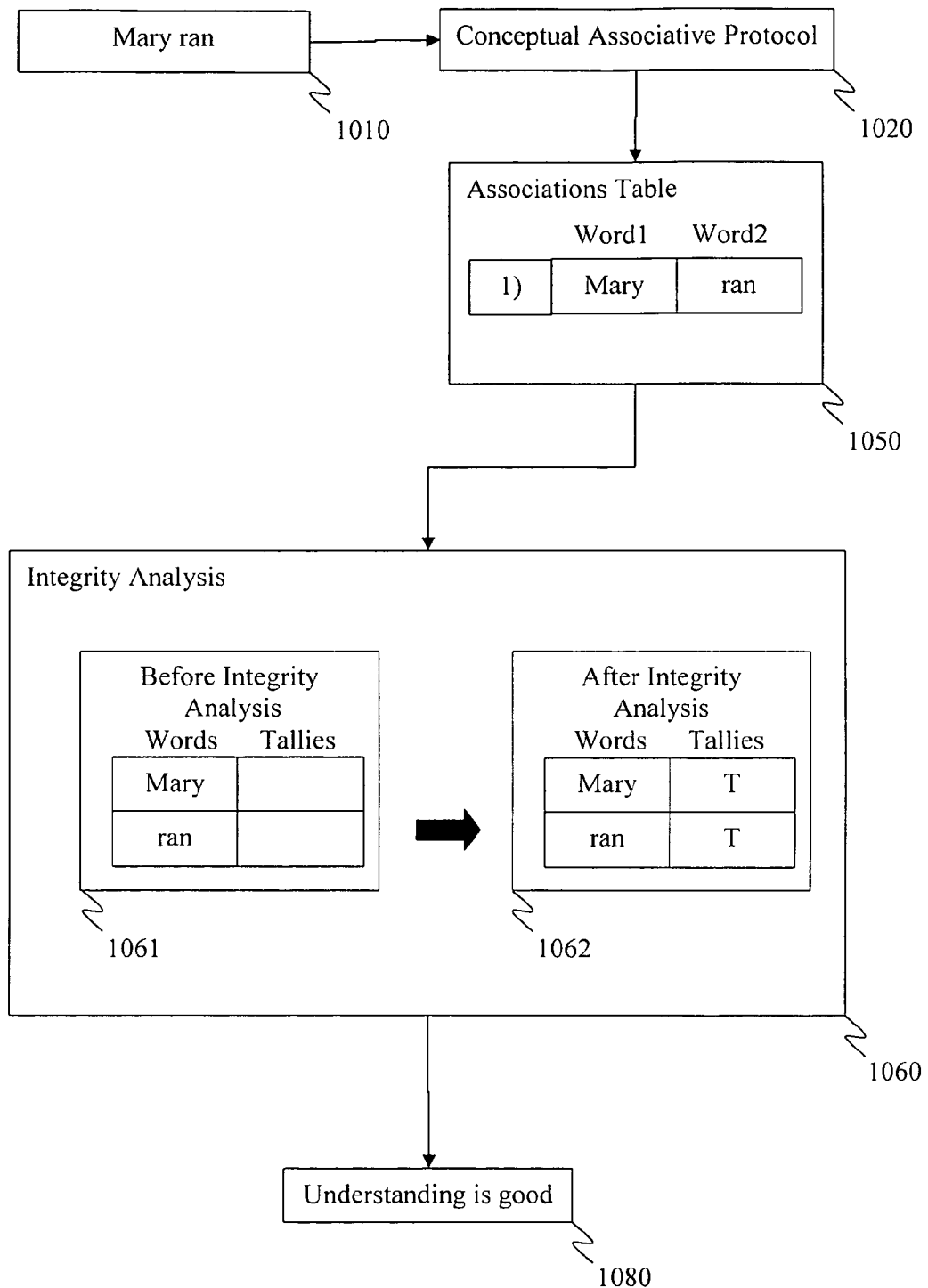
FIG. 1A illustrates an exemplary non-limiting diagram of some steps of the inventive method dealing with a simple sentence such as "Mary ran;"

FIG. 1A illustrates an exemplary non-limiting diagram of some steps of the inventive method dealing with a simple sentence such as "Mary ran." The Data Corpus 1010 (FIG. 1A) such as a query or sentence "Mary ran" is displayed. Next, a Conceptual Associative Protocol 1020 (FIG. 1A) such as CIRN is used to identify, form or create any desired or undesired associations (conceptual, grammatical, etc.) between the word "Mary" and the word "ran." For example, in this particular FIG. 1A, because of the grammatical essence (or other) that the word elements have or are, the Conceptual Associative Protocol finds or forms an association between "Mary" and "ran." As a result, the Associations Table 1050 (FIG. 1A) displays the associations created, found or formed between the words "Mary" and "ran." For example, in the Associations Table, in the only row, "Mary" under the first column, or Word1, is being associated with "ran" under its corresponding second column, or Word2. Then, the Integrity Analysis 1060 (FIG. 1A) inspects and/or analyzes if all (or some) word elements, through their associations, form a line or set or single network of associations that continues. In other words, the analysis is to inspect if the associations formed involve every single element of the Data Corpus. In such fashion, if there are any word elements left out or that are not part of any associations formed, these word elements can then be used to identify if the data corpus is conceptually, meaningfully and/or grammatical integral, correct or coherent or composed or several corpuses. The Before Integrity Analysis 1061 (FIG. 1A) by means of depiction, illustrates the elements of the Data Corpus, under the Words column, with each of their corresponding "tallies" under the Tallies column. As illustrated, neither word has a tally or value in its corresponding tally field. This is because the Integrity Analysis has not yet been performed. The After Integrity Analysis 1062 (FIG. 1A), by means of depiction, shows the resulting tallies or involvement that every word of the data corpus experiences with associations that were formed by the Conceptual Associative Protocol. For example, the words "Mary" and "ran" are both part of a given association(s) as illustrated in the Associations Table. As a result, each word is assigned or identified by a tally value of "T." In such fashion, every word element of the data corpus finds itself being identified as forming part of any given or experienced association. As a result, because every word element is indeed present or part of an association, the Data Corpus or "Mary ran" is considered or is grated to be "understandably good or correct." The Integrity Analysis Result 1080 (FIG. 1A) displays the sentence "Understanding is good" implying that the Data Corpus is found to follow at least one of the desired (or not) grammatical, conceptual and/or meaningful requirements to be considered "good."

Figure 1B:
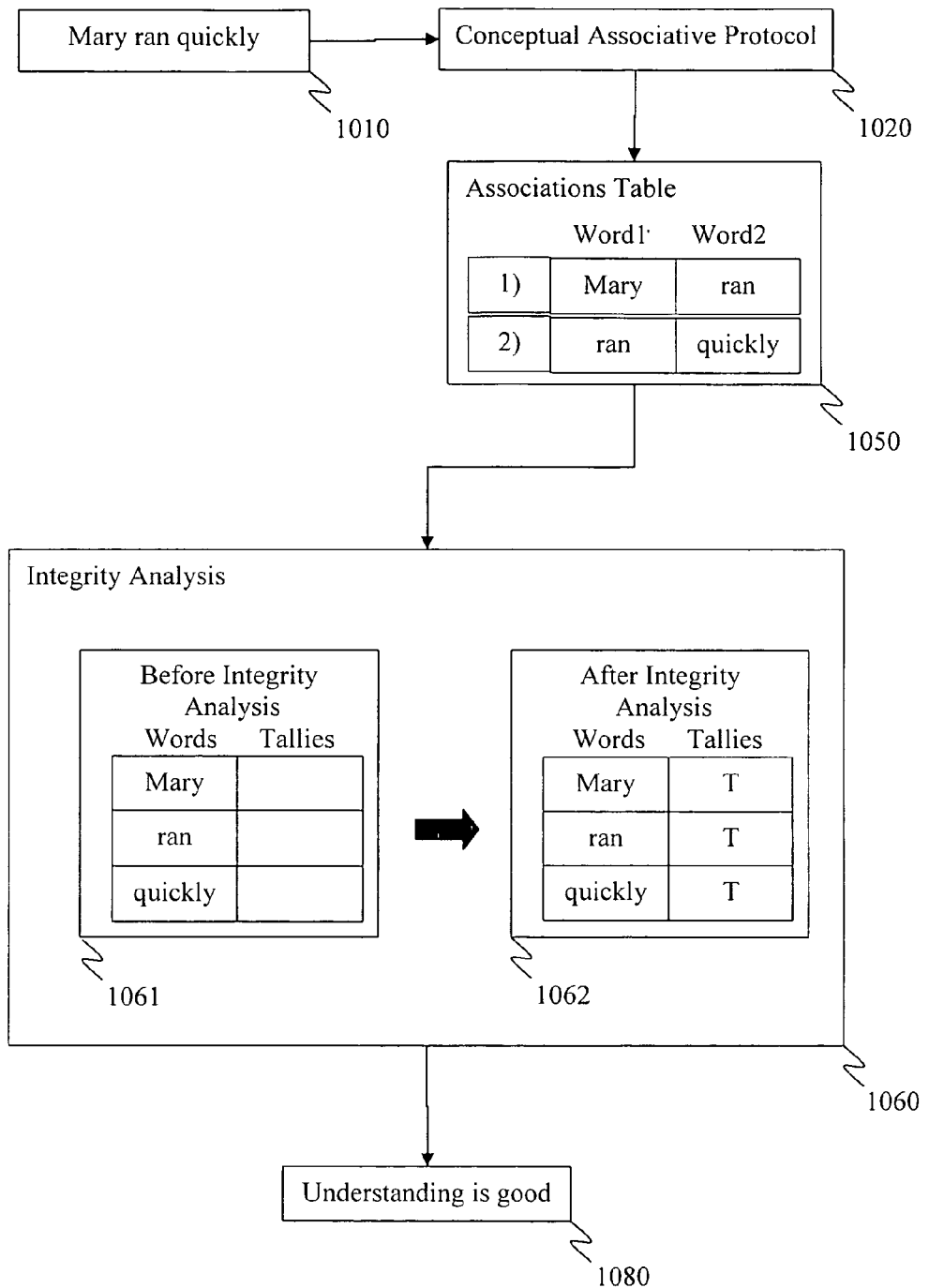
FIG. 1B illustrates an exemplary non-limiting diagram of some steps of the inventive method this time dealing with another sentence such as "Mary ran quickly;"

FIG. 1B illustrates an exemplary non-limiting diagram of some steps of the inventive method this time dealing with another sentence such as "Mary ran quickly." The Data Corpus 1010 (FIG. 1B) such as a query or sentence "Mary ran quickly" is displayed. Next, a Conceptual Associative Protocol 1020 (FIG. 1B) such as CIRN is used to identify, form and/or create any desired or undesired associations (conceptual, grammatical, meaningful, etc.) between the words "Mary," "ran" and "quickly." For example, in this particular FIG. 1B, because of the grammatical essence (or other) the word elements are found to have (according to the Conceptual Associative Protocol) or form several associations among themselves. As a result, the Associations Table 1050 (FIG. 1B) displays each of the two associations created, found or formed between their corresponding word elements. For example, in the Associations Table, in the first row, shows that "Mary," under the first column, or Word1, associates with "ran" under the corresponding second column, or Word2 on its right side. In similar fashion, in the second row, the word "ran" associates with "quickly" to its right. Then, the Integrity Analysis 1060 (FIG. 1B) inspects and/or analyzes if all (or some) word elements, through their associations, form a line or set of associations that continues. In other words, the analysis inspects if the associations formed involve every single element of the Data Corpus. In such fashion, if there are any word elements left out or that are not part of any associations formed, these word elements can then be used to identify if the data corpus is conceptually, meaningfully and/or grammatical integral, correct or coherent. The Before Integrity Analysis 1061 (FIG. 1B) by means of depiction, illustrates all the elements of the Data Corpus, under the Words column, with each of their corresponding "tallies" under the Tallies column. As illustrated, neither of the three words has a tally or value in their corresponding tally fields. This is because the Integrity Analysis has not yet been performed. The After Integrity Analysis 1062 (FIG. 1B), by means of depiction, shows the resulting tallies or involvement that every word of the data corpus experiences with associations that were formed by the Conceptual Associative Protocol. For example, the tally or value "T" is used in this example to identify all those words that are involved on a particular or given association. Consequentially, the word "Mary" shows a tally or value "T," the word "ran" shows another tally or value "T" and finally the word "quickly" also shows a tally or value "T" meaning and/or indicating that all three words are indeed part of an association illustrated in the Associations Table. In such fashion, because all associations form a network or every word element of the data corpus is part of an association, the Data Corpus or "Mary ran quickly" is considered to be "understandably good or proper." The Integrity Analysis Result 1080 (FIG. 1B) displays the said outcome of analyzing such as Data Corpus by displaying the sentence "Understanding is good;" which obviously implies that "Mary ran quickly" is found to be at least one of a: grammatical correct, conceptual proper and/or meaningfully accurate or ultimately "good."

Figure 1C:
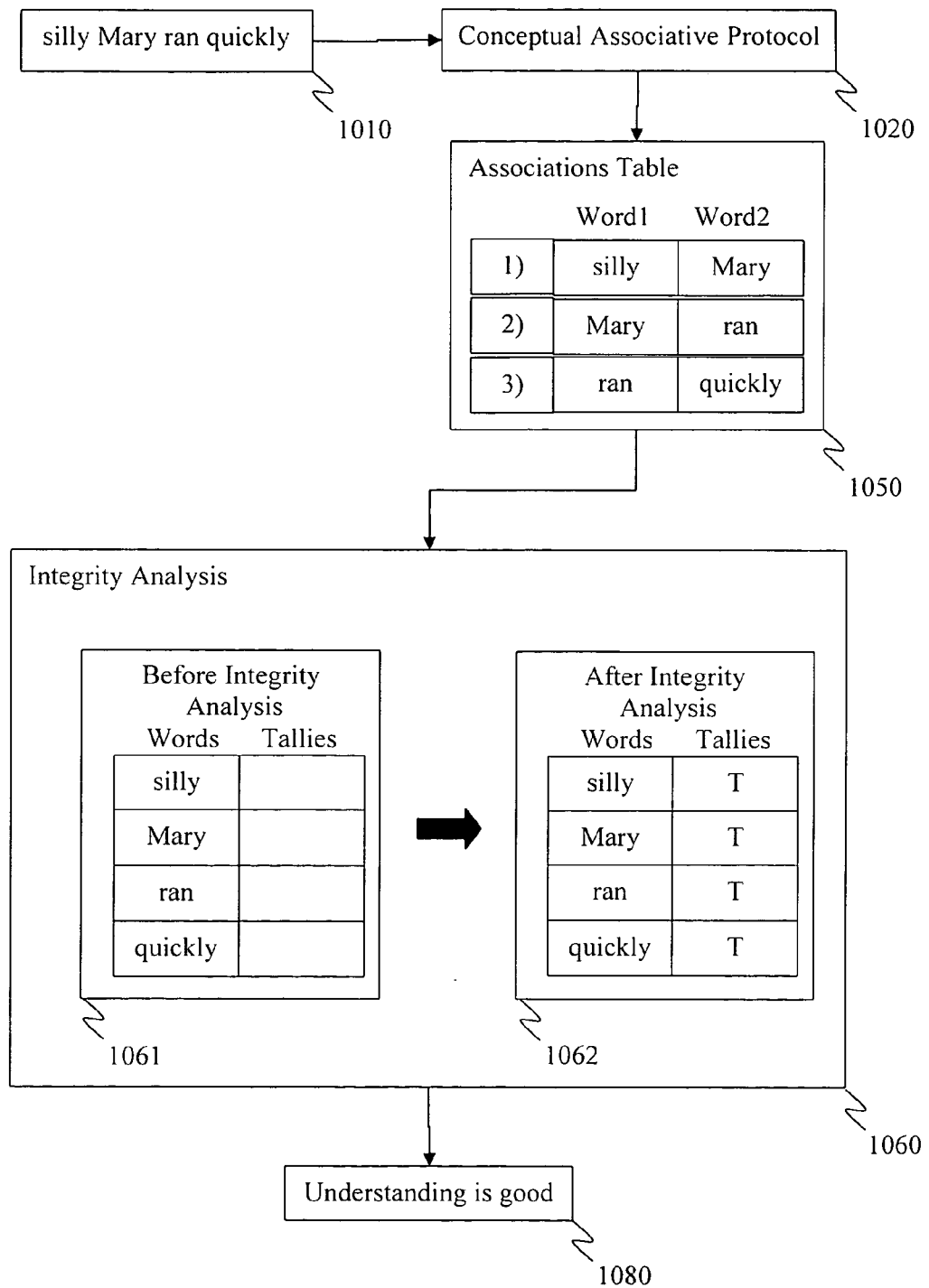
FIG. 1C illustrates another exemplary non-limiting diagram of some steps of the inventive method this time dealing with a different and more complex sentence such as "silly Mary ran quickly;"

FIG. 1C illustrates another exemplary non-limiting diagram of some steps of the inventive method this time dealing with a different and more complex sentence such as "silly Mary ran quickly." The Data Corpus 1010 (FIG. 1C) such as a query or sentence "silly Mary ran quickly" is displayed. Next, a Conceptual Associative Protocol 1020 (FIG. 1C) such as CIRN is used to identify, form and/or create any desired or undesired associations (conceptual, grammatical, meaningful, etc.) between the words "silly," "Mary," "ran" and "quickly." For example, in this particular FIG. 1C, because of the grammatical essence (or other) the word elements are found to have (according to the Conceptual Associative Protocol) or form several associations among themselves. As a result, the Associations Table 1050 (FIG. 1C) displays each of the three associations created, found or formed between their corresponding word elements. For example, in the Associations Table, in the first or top row, shows the word "silly," under the first column or Word1, being associated with the word "Mary," under the second column, or Word2. Also in the Associations Table, the word "Mary" is associated with "ran" in the middle or second row. Finally, in the last or third row, the word "ran" associates with "quickly." The Integrity Analysis 1060 (FIG. 1C) inspects and/or analyzes if all (or some) word elements, through their associations, form a line or set of associations that continues. In other words, the analysis inspects if the associations formed involve every single element of the Data Corpus. In such fashion, if there any word elements which are left out or do not form part of any of the associations formed, can then be used to identify if the data corpus is indeed conceptually, meaningfully and/or grammatically integral, correct or coherent. The Before Integrity Analysis 1061 (FIG. 1C) by means of depiction, shows the word elements of the Data Corpus before they are analyzed. As a result, this table illustrates all the elements of the Data Corpus, under the Words column, with each of their corresponding "tallies" under the Tallies column with no tallies or values assigned yet. In contrast, the After Integrity Analysis 1062 (FIG. 1C), by means of depiction, shows the resulting tallies or involvement that every word of the data corpus experiences through associations that were formed by the Conceptual Associative Protocol. For example, the tally or value "T" is used in this example to identify every word involved in a particular or given association. Consequentially, the word "silly" shows or has a "T" in its tally field, the word "Mary" shows a tally or value "T," the word "ran" shows another tally or value "T" and finally the word "quickly" also shows a tally or value "T" meaning and/or indicating that all four words are indeed part of an association as illustrated in the Associations Table. In such fashion, because every single word element of the data corpus is part of an association, the Data Corpus or "silly Mary ran quickly" is considered to be "understandably good or proper." The Integrity Analysis Result 1080 (FIG. 1C) displays the said outcome of analyzing said Data Corpus by displaying the sentence "Understanding is good;" which obviously implies that "silly Mary ran quickly" is found, at least in chosen criteria, to be grammatical correct, conceptual proper and/or meaningfully accurate (good).

Figure 1D:
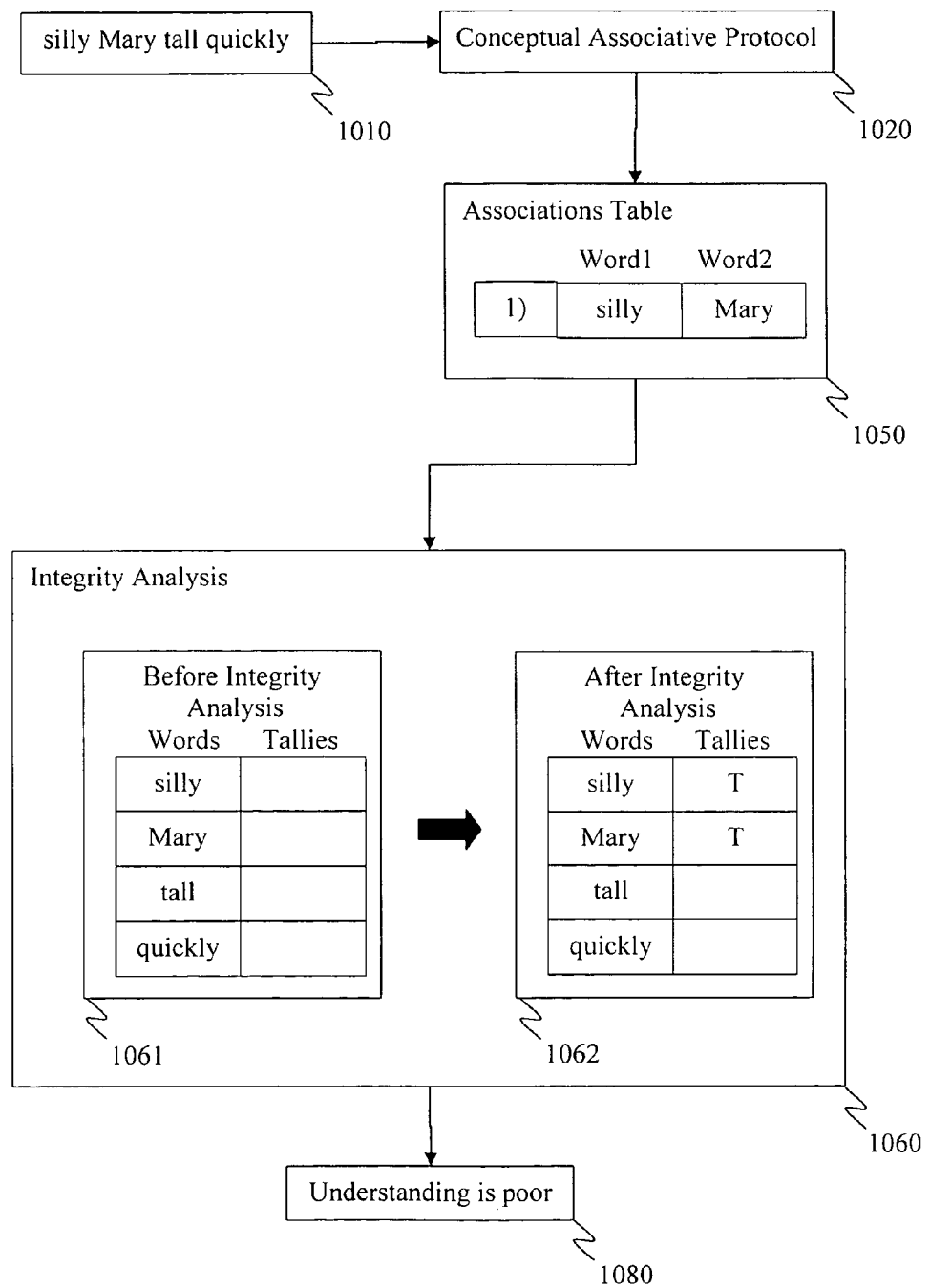
FIG. 1D illustrates another exemplary non-limiting diagram of some steps of the inventive method this time dealing with a different and more complex sentence such as "silly Mary tall quickly" which according to English Grammar has an incomplete or incorrect grammatical integrity.

FIG. 1D illustrates another exemplary non-limiting diagram of some steps of the inventive method this time dealing with a different and more complex sentence such as "silly Mary tall quickly" which according to English Grammar has an incomplete or incorrect grammatical integrity. The Data Corpus 1010 (FIG. 1D) such as a query or sentence "silly Mary tall quickly" is displayed. Next, a Conceptual Associative Protocol 1020 (FIG. 1D) such as CIRN is used to identify, form and/or create any desired or undesired associations (conceptual, grammatical, meaningful, etc.) between the words "silly," "Mary," "tall" and "quickly." For example, in this particular FIG. 1D, because of the grammatical essence (or other) of the word elements, it is found (according to the Conceptual Associative Protocol) that only a few associations are possible or desired among them. As a result, the Associations Table 1050 (FIG. 1D) only displays a single association between the word elements "silly" and "Mary" in the only displayed row. In this association, the word "silly," under the first column or Word1, is being associated with the word "Mary," under the second column, or Word2. Consequentially, many word elements of the Data Corpus did not experience an association or failed to associate with each other. The Integrity Analysis 1060 (FIG. 1D) inspects and/or analyzes if all (or some) word elements, through their associations, form a line or set of associations that continues. In other words, the analysis inspects if all the word elements of the Data Corpus are involved in at least one association, which also means, that the analysis is identifying if any word elements are left unassociated in the Data Corpus. In such fashion, if there any word elements which are left out or do not form part of any of the associations formed, they can then be used to identify the conceptual integrity, grammatical integrity, meaningful integrity and/or other type of integrity of the data corpus. The Before Integrity Analysis 1061 (FIG. 1D) by means of depiction, shows the word elements of the Data Corpus before they are analyzed. As depicted, this table illustrates all the elements of the Data Corpus, under the Words column, with each of their corresponding "tallies" under the Tallies column having no tallies or values assigned yet. In contrast, the After Integrity Analysis 1062 (FIG. 1D), by means of depiction, shows the resulting tallies or the involvement that every word of the data corpus experiences through associations that were formed by the Conceptual Associative Protocol. For example, the tally or value "T" is used in this example to identify every word involved in a particular or given association. Consequentially, only the words "silly" and "Mary" show or have a "T" in their tally fields. In contrast, the words "tall" and "quickly" show no value or "T" under their corresponding tally fields. This is because "tall" and "quickly" did not form or experience any associations. In such fashion, because not every word element of the data corpus has experienced or belongs to a particular association, it is determined that the Data Corpus or "silly Mary tall quickly" is poorly constructed or grammatically incorrect (its integrity is incomplete or incorrect—poor). The Integrity Analysis Result 1080 (FIG. 1D) displays the said outcome of analyzing said Data Corpus announcing or displaying the sentence "Understanding is poor;" which obviously implies that "silly Mary tall quickly" is found, at least with the chosen associative analysis criteria, to be grammatically incorrect, non-conceptual and/or meaningfully inaccurate (poor).

Figure 1E:
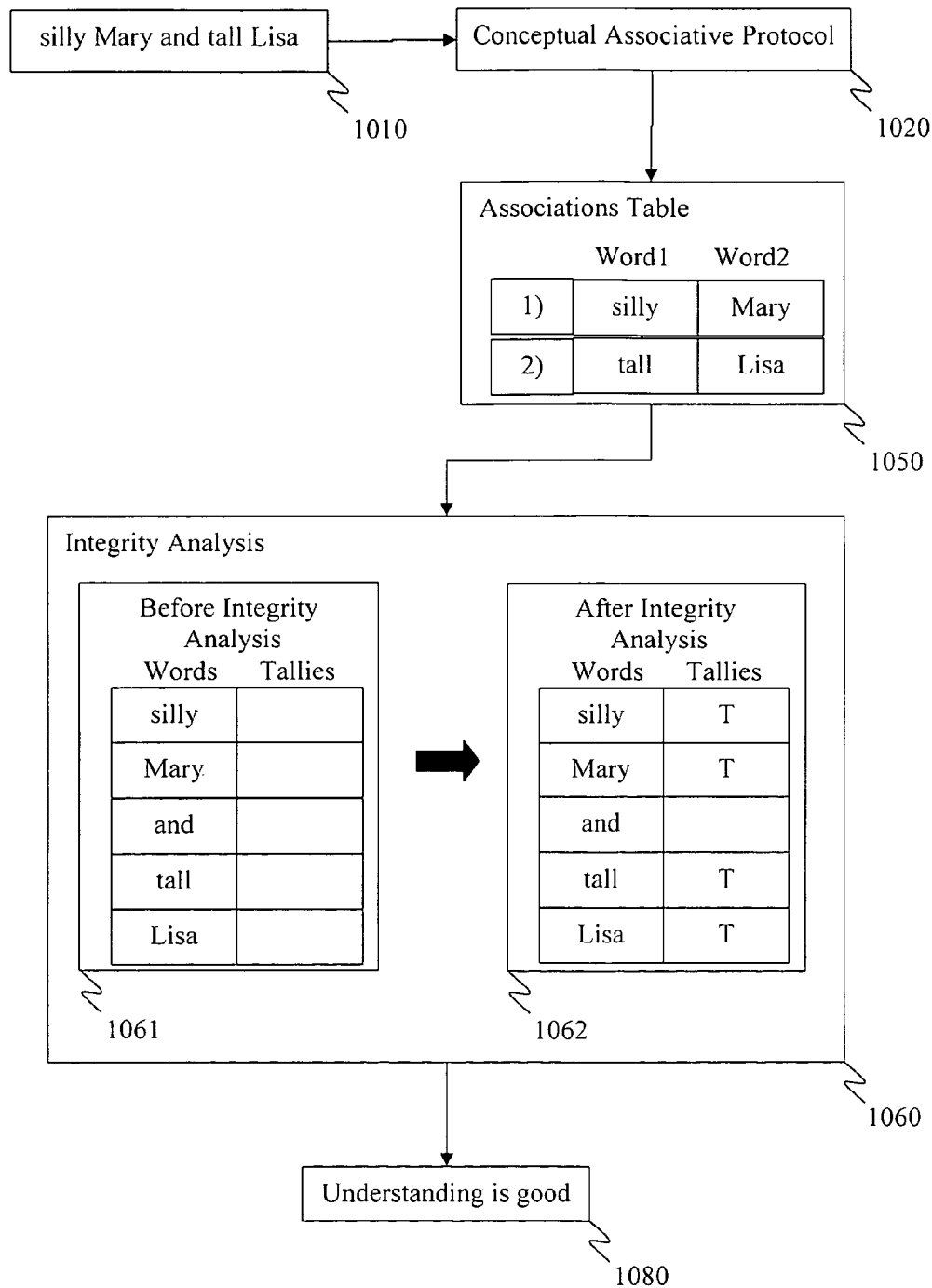
FIG. 1E illustrates another exemplary non-limiting diagram of some steps of the inventive method this time dealing with several sentences such as "silly Mary and tall Lisa;"

FIG. 1E illustrates another exemplary non-limiting diagram of some steps of the inventive method this time dealing with several sentences such as "silly Mary and tall Lisa." Noteworthy, this data corpus is comprised of two sentences. The Data Corpus 1010 (FIG. 1E) such as a query or sentence "silly Mary and tall Lisa" is displayed. Next, a Conceptual Associative Protocol 1020 (FIG. 1E) such as CIRN is used to identify, form and/or create any desired or undesired associations (conceptual, grammatical, meaningful, etc.) between the words "silly," "Mary," "and," "tall" and "Lisa." For example, in this particular FIG. 1E, because of the grammatical essence (or other) of the word elements, it is found (according to the Conceptual Associative Protocol) that only a few associations are possible or desired among them. As a result, the Associations Table 1050 (FIG. 1E) displays two associations; wherein the first association (first row) involves the word elements "silly" and "Mary" and the second association (second row) involves the word elements "tall" and "Lisa." The Integrity Analysis 1060 (FIG. 1E) inspects and/or analyzes the Data Corpus' integrity or if all (or some) word elements, through their associations, form a line or set of associations that continues. In other words, the analysis inspects if all the word elements of the Data Corpus are involved in at least one association, which also means, that the analysis is identifying if any word elements are left unassociated in the Data Corpus. In such fashion, if there any word elements which are left out or do not form part of any of the associations formed, they can then be used to identify the conceptual integrity, grammatical integrity, meaningful integrity, other type of integrity and/or to identify if the data corpus is comprised of several data corpuses, such as several sentences. The Before Integrity Analysis 1061 (FIG. 1E) by means of depiction, shows the word elements of the Data Corpus before they are analyzed. As depicted, this table illustrates all the elements of the Data Corpus, under the Words column, with each of their corresponding "tallies" under the Tallies column having no tallies or values assigned yet. In contrast, the After Integrity Analysis 1062 (FIG. 1E), by means of depiction, shows the resulting tallies or the involvement that every word of the data corpus experiences through associations that were formed by the Conceptual Associative Protocol. For example, the tally or value "T" is used in this example to identify every word involved in a particular or given association. Consequentially, only the words "silly," "Mary," "tall" and "Lisa" show or have a "T" in their corresponding tally fields. As illustrated, the word "and" shows or has no tally or value "T." This is because the word "and" did not form or experience any associations as illustrated in the Association Table. However, in the English language, the word "and" can be specifically used to separate or identify different regions or sections of information. Accordingly, the word "and" in this particular case, is separating two sentences or phrases. As a result, although the word "and" experienced no associations, it may be ignored or used to separate/identify different data corpuses or different networks of associations implying several sentences. Consequentially, the Data Corpus or "silly Mary and tall Lisa" is said to have a "good" grammatical (or any other type) integrity and, in fact, be comprised of as in this example, of two sentences or phrases which are separated by the word "and.". The Integrity Analysis Result 1080 (FIG. 1E) displays the said outcome of analyzing said Data Corpus announcing or displaying "Understanding is good;" which obviously implies that "silly Mary and tall Lisa" is found, at least with the chosen associative analysis criteria, to be grammatical correct, proper and/or accurate (good).

Figure 1F:
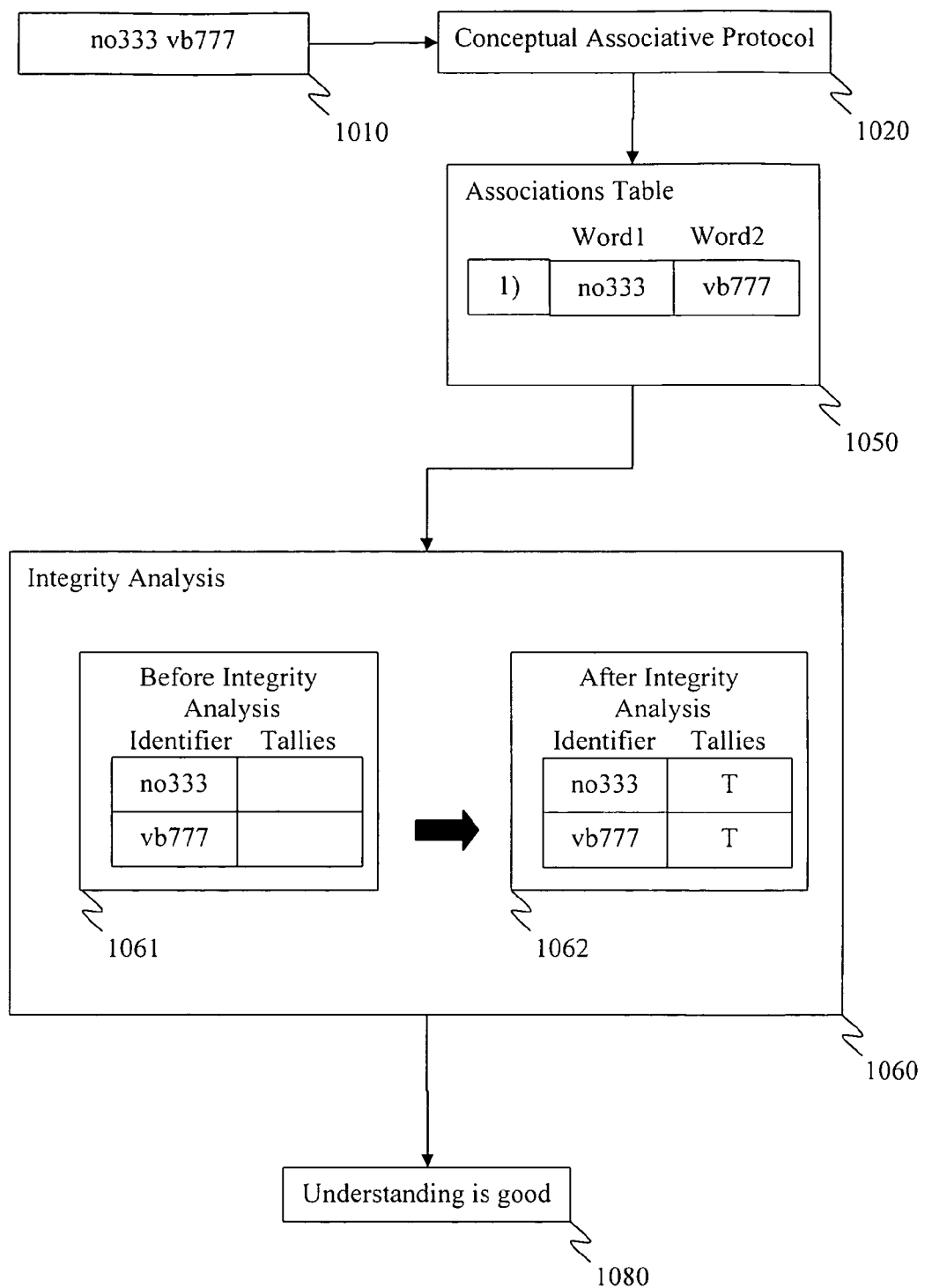
FIG. 1F illustrates yet another exemplary non-limiting diagram of some steps of the inventive method illustrated in FIG. 1A, this time dealing with a sentence of group identifiers (a type of word element) instead of English words, such as "no333 vb777;" which in English, translates and/or represents the sentence "Mary ran;"

FIG. 1F illustrates yet another exemplary non-limiting diagram of some steps of the inventive method illustrated in FIG. 1A, this time dealing with a sentence of group identifiers (a type of word element) instead of English words, such as "no333 vb777;" which in English, translates and/or represents the sentence "Mary ran." The Data Corpus 1010 (FIG. 1F) such as a query or group identifier sentence "no333 vb777" is displayed. Next, a Conceptual Associative Protocol 1020 (FIG. 1F) such as CIRN is used to identify, form and/or create any desired or undesired associations (conceptual, grammatical, meaningful, etc.) between the said group identifiers "no333" and "vb777." For example, in this particular FIG. 1F, because of the group identifiers, the Conceptual Associative Protocol finds that "no333" (Mary) associates to "vb777" (ran). As a result, the Associations Table 1050 (FIG. 1F) displays the formed association; wherein the word element or group identifier "no333" associates with "vb777." The Integrity Analysis 1060 (FIG. 1F) inspects and/or analyzes the Data Corpus' integrity or if all (or some) word elements, through their associations, form a line or set of associations that continues. In other words, the analysis inspects if all group identifiers of the Data Corpus are involved in at least one association, which also means, that the analysis is identifying if any group identifier is left unassociated in the Data Corpus. In such fashion, if any word elements (group identifiers) are left out or do not form part of any of the association, the said unassociated group identifier can then be used to identify the conceptual integrity, grammatical integrity, meaningful integrity and/or other type of integrity of the data corpus. The Before Integrity Analysis 1061 (FIG. 1F) by means of depiction, shows the word elements of the Data Corpus before they are analyzed. As depicted, this table illustrates all group identifiers of the Data Corpus, under the Identifier column, with each of their corresponding "tallies" under the Tallies column having no tallies or values assigned yet. In contrast, the After Integrity Analysis 1062 (FIG. 1F), by means of depiction, shows the resulting tallies or the involvement that every group identifier of the data corpus experiences through associations that were formed by the Conceptual Associative Protocol. For example, the tally or value "T" is used in this example to identify every word involved in a particular or given association. Consequentially, "no333" and "vb777" show to have a "T" in their corresponding tally fields. Paying close attention to the After Integrity Analysis table we can observe that every group identifier has a "T" meaning that all group identifiers belong to at least one association. Consequentially, the Data Corpus or "no333 vb777" is said to have a "good" grammatical (or any other type) integrity. The Integrity Analysis Result 1080 (FIG. 1F) displays the said outcome of analyzing said Data Corpus announcing or displaying "Understanding is good;" which obviously implies that "no333 vb777" (Mary ran) is found, at least with the chosen associative analysis criteria, to be grammatical correct, proper and/or accurate (good).

Figure 1G:
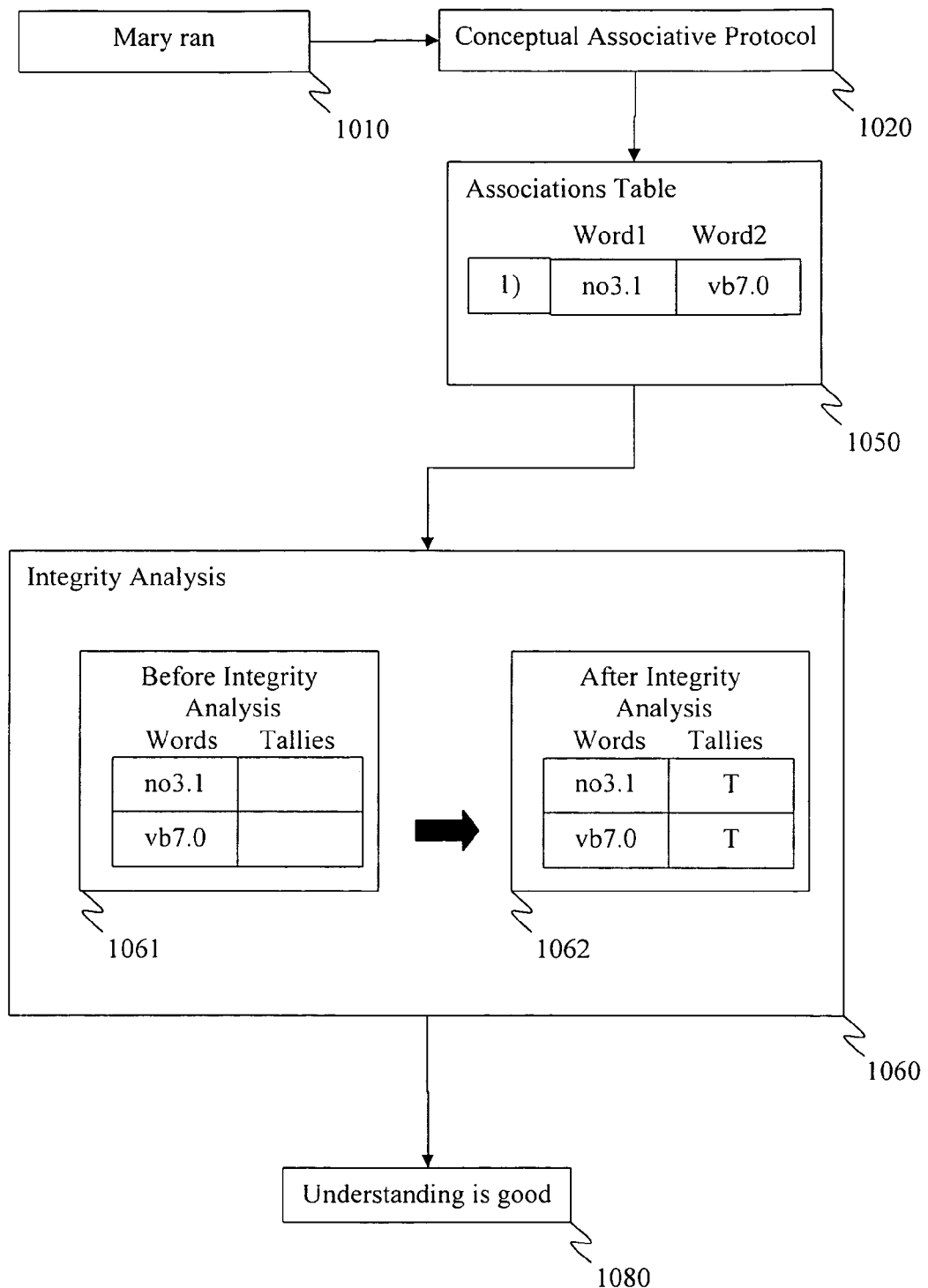
FIG. 1G illustrates yet another exemplary non-limiting diagram of some steps of the inventive method illustrated in FIG. 1A, this time dealing with a sentence of eeggis (a type of word element) instead of English words, such as "no3.1 vb7.0;" which in English, translates and/or represents the sentence "Mary ran;"

FIG. 1G illustrates yet another exemplary non-limiting diagram of some steps of the inventive method illustrated in FIG. 1A, this time dealing with a sentence of eeggis (a type of word element) instead of English words, such as "no3.1 vb7.0;" which in English, translates and/or represents the sentence "Mary ran." The Data Corpus 1010 (FIG. 1G) such as a query or eeggi sentence "no3.1 vb7.0" is displayed. Next, a Conceptual Associative Protocol 1020 (FIG. 1G) such as CIRN is used to identify, form and/or create any desired or undesired associations (conceptual, grammatical, meaningful, etc.) between the said eeggis "no3.1" and "vb7.0." For example, in this particular FIG. 1G, because of the eeggis involved, the Conceptual Associative Protocol finds that "no3.1" (Mary) associates to "vb7.0" (ran). As a result, the Associations Table 1050 (FIG. 1G) displays the formed association; wherein the word element or eeggi "no3.1" associates with "vb7.0." The Integrity Analysis 1060 (FIG. 1G) inspects and/or analyzes the Data Corpus' integrity or if all (or some) eeggis, through their associations, form a line or set of associations that continues. In other words, the analysis inspects if all eeggis of the Data Corpus are involved in at least one association, which also means, that the analysis is identifying if any eeggi is left unassociated. In such fashion, if there any eeggi left out or that it does not form part of any of the association, the said unassociated eeggi can then be used to identify the conceptual integrity, grammatical integrity, meaningful integrity and/or other type of integrity or coherence of the data corpus. The Before Integrity Analysis 1061 (FIG. 1G) by means of depiction, shows the word elements of the Data Corpus before they are analyzed. As depicted, this table illustrates all group identifiers of the Data Corpus, under the Identifier column, with each of their corresponding "tallies" under the Tallies column having no tallies or values assigned yet. In contrast, the After Integrity Analysis 1062 (FIG. 1G), by means of depiction, shows the resulting tallies or the involvement that every eeggi of the data corpus experiences through associations formed by the Conceptual Associative Protocol. For example, the tally or value "T" is used in this example to identify every eeggi involved in a particular or given association. Consequentially, "no3.1" and "vb7.0" show to have a "T" in their corresponding tally fields. Paying close attention to the After Integrity Analysis table we can observed that every eeggi has a "T," meaning that all eeggis in the Data Corpus belong to at least one association. Consequentially, the Data Corpus or "no3.1 vb7.0" is said to have a "good" grammatical (or any other type) integrity. The Integrity Analysis Result 1080 (FIG. 1G) displays the said outcome of analyzing said Data Corpus announcing or displaying "Understanding is good;" which obviously implies that "no3.1 vb7.0" (Mary ran) is found, at least with the chosen associative analysis criteria, to be grammatically correct, proper and/or accurate (good).

Figure 2:
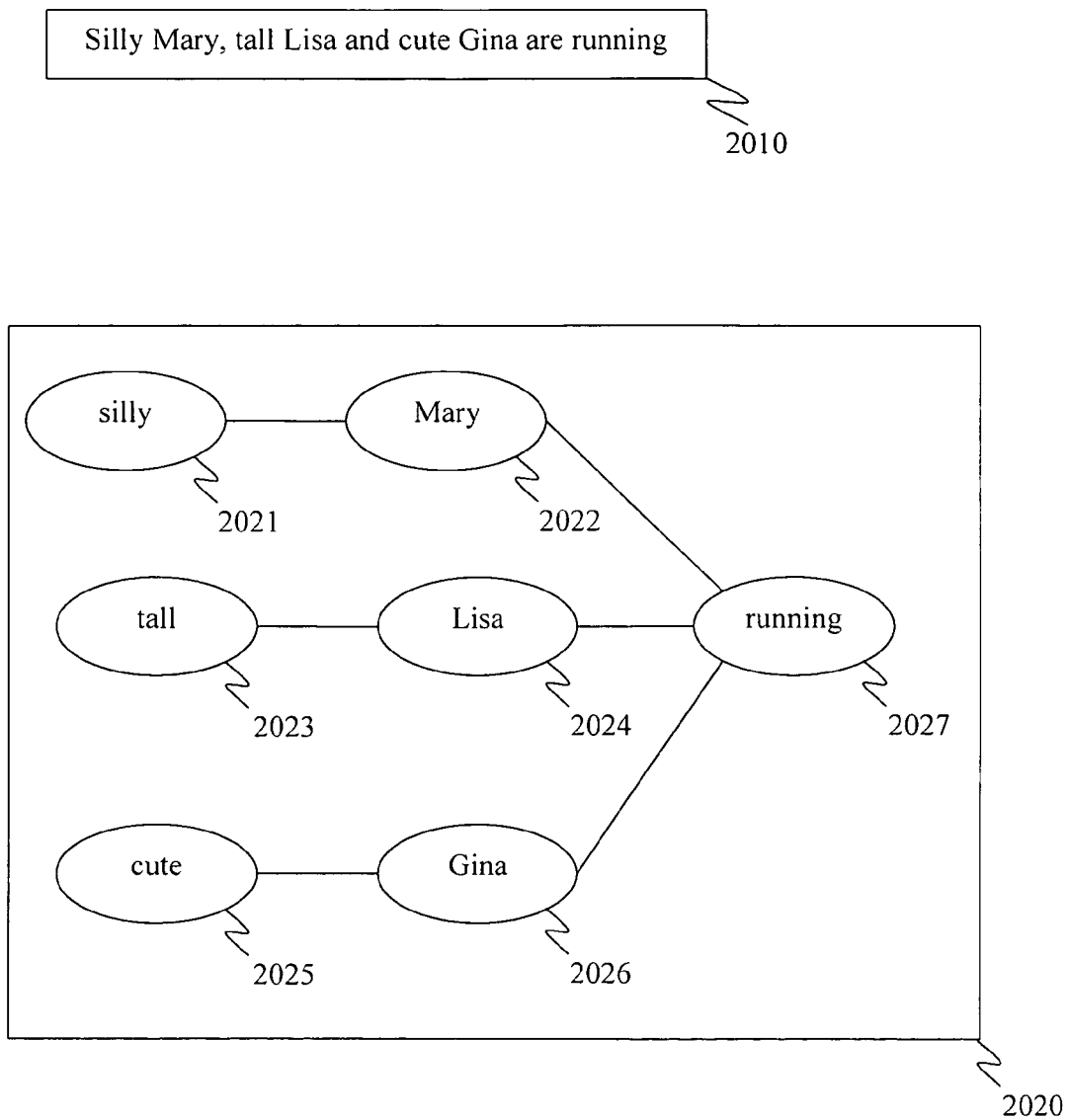
FIG. 2 is a non-limiting exemplary diagram of some steps of the inventive method illustrating a network or continuum of word element associations.

FIG. 2 is a non-limiting exemplary diagram of some steps of the inventive method illustrating a network or continuum of word element associations. The Data Corpus 2010 (FIG. 2) comprises the long sentence "silly Mary, tall Lisa and cute Gina are running." The Graphical Network Diagram 2020 (FIG. 2) depicts the associations resulting from the said Data Corpus. For example, the word "silly" 2021 (FIG. 2) is associated to the word "Mary" 2022 (FIG. 2). The word "tall" 2023 (FIG. 2) is associated to the word "Lisa" 2024 (FIG. 2). The word "cute" 2025 (FIG. 2) is associated to the word "Gina" 2026 (FIG. 2) and finally, the word "running" 2027 (FIG. 2) is associated to "Mary," "Lisa" and "Gina." In such fashion, all the words form a continuum or network of information; a continuum which in fact can be explored or experienced by selecting any word of the network and following its association to another word until no more words (or associations) are left.

Figure 3A:
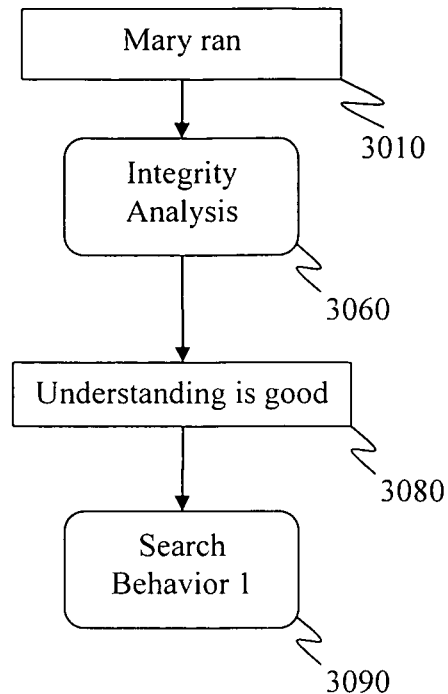
FIG. 3A is a non-limiting exemplary diagram of a Data Corpus such as a query with a good grammatical integrity and corresponding selected search behavior.

FIG. 3A is a non-limiting exemplary diagram of a Data Corpus such as a query with a good grammatical integrity and corresponding selected search behavior. The Data Corpus 3010 (FIG. 3A) such as the query "Mary ran" is displayed. Then the Integrity Analysis 3060 (FIG. 3A) analyzes and/or identifies the coherence, or in this particular example, the grammatical integrity of the Data Corpus. The Integrity Analysis Result 3080 (FIG. 3A) displays the message "Understanding is good" meaning that the exemplary Data Corpus or query is grammatically correct. Next, the Search Behavior 3090 (FIG. 3A) is selected or chosen for performing a search corresponding to the integrity of its query.

Figure 3B:
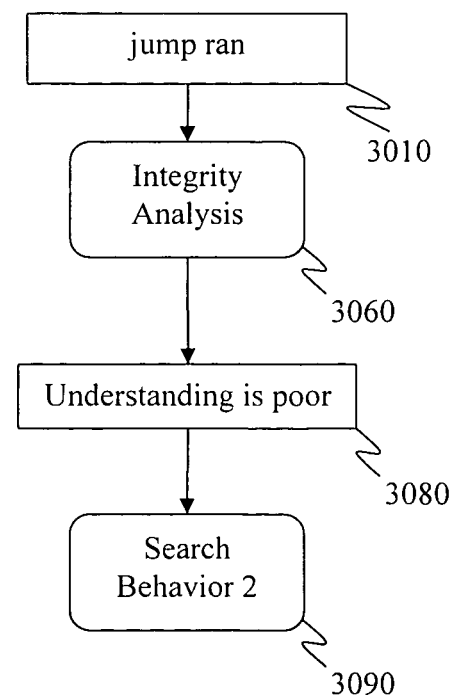
FIG. 3B is a non-limiting exemplary diagram of a Data Corpus such as a query with a poor grammatical integrity and corresponding selected search behavior.

FIG. 3B is a non-limiting exemplary diagram of a Data Corpus such as a query with a poor grammatical integrity and corresponding selected search behavior. The Data Corpus 3010 (FIG. 3B) such as the query "jump ran," which is grammatically and/or conceptually incorrect, is displayed. Then the Integrity Analysis 3060 (FIG. 3B) analyses and/or identifies the coherence, or in this particular example, the failed grammatical integrity of the Data Corpus. The Integrity Analysis Result 3080 (FIG. 3B) displays the message "Understanding is poor" meaning that the exemplary Data Corpus or query is grammatically incorrect. Next, the corresponding Search Behavior 3090 (FIG. 3B) is selected or chosen for performing a search corresponding to the integrity of its query, such as a text-based search comprising results with the words of the query in randomly isolated order.

Figure 4:
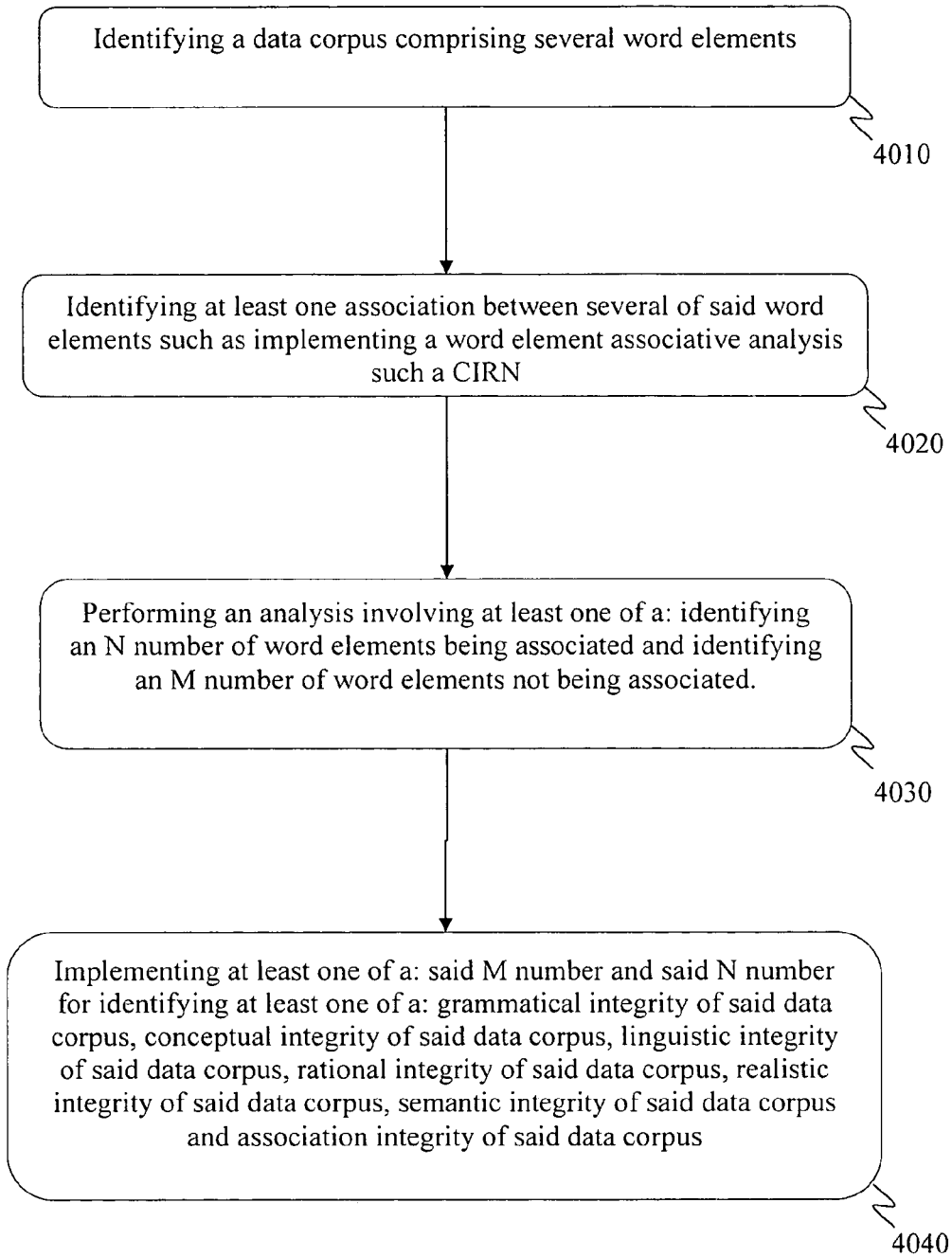
FIG. 4 is a non-limiting block flow diagram of some general and significant steps of the inventive method.

FIG. 4 is a non-limiting block flow diagram of some general and significant steps of the inventive method. The initial or First Step 4010 (FIG. 4) involves the obvious step of identifying a data corpus comprising several word elements. For example, identifying the word elements in a query or other. The next or Second Step 4020 (FIG. 4) involves the step of identifying at least one association between several of said word elements such as implementing a word element associative analysis such a CIRN. For example, through an associative formation or identification analysis such as CIRN, particular sets of associations between the word elements of the Data Corpus can be found, identified or formed. In such fashion, when a query such as "silly Mary" is studied and/or analyzed through CIRN, the word "silly" becomes associated with "Mary." The next or Third Step 4030 (FIG. 4) involves the step of performing an analysis involving at least one of a: identifying an N number of word elements being associated and identifying an M number of word elements not being associated. For example, in this step, the number of word elements, such as M, belonging to an association and/or the number of word elements, such as N, not belonging to any association from the Data Corpus are identified. The next or Fourth Step 4040 (FIG. 4) involves the step of implementing at least one of a: said M number and said N number for identifying at least one of a: grammatical integrity of said data corpus, conceptual integrity of said data corpus, linguistic integrity of said data corpus, rational integrity of said data corpus, realistic integrity of said data corpus, semantic integrity of said data corpus and association integrity of said data corpus. For example, in a query made of ten word elements, it is found that eight word elements are associated and two other elements are not. Accordingly, using the number of associated word elements (eight) and/or the number of word elements without any associations (two), their query can be determined to be indeed coherent or has a particular integrity such as a grammatical integrity.

Figure 5:
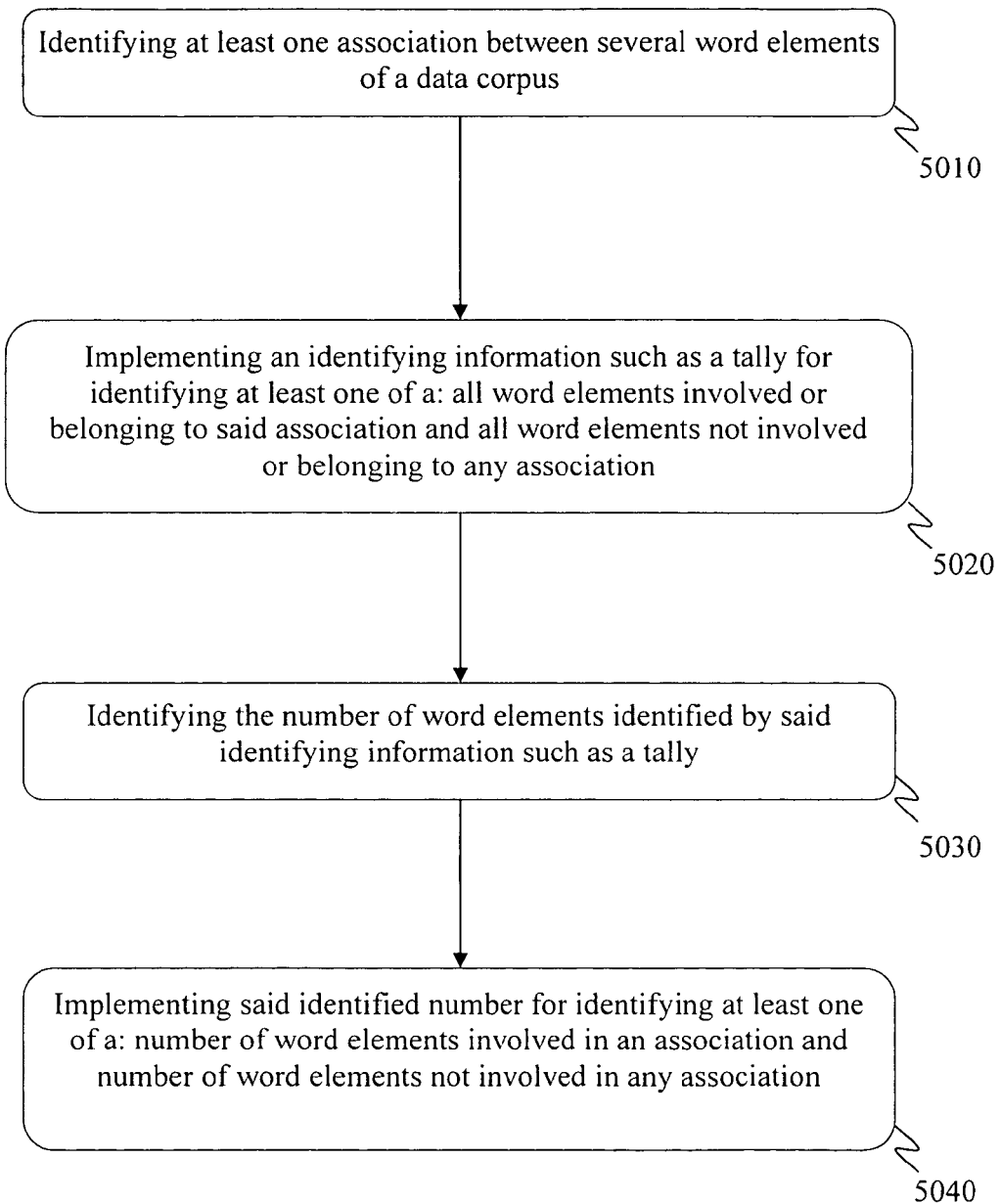
FIG. 5 is an exemplary non-limiting block diagram of some significant steps the inventive method for identifying at least one of a: the number of word elements experiencing associations in a data corpus and/or the number of word elements not experiencing any associations in a data corpus.

FIG. 5 is an exemplary non-limiting block diagram of some significant steps the inventive method for identifying at least one of a: the number of word elements experiencing associations in a data corpus and/or the number of word elements not experiencing any associations in a data corpus. The First Step 5010 (FIG. 5) involves the step of identifying at least one association between several word elements of a data corpus. For example, in this initial step, one or several associations involving several word elements of a data corpus are identified. The next or Second Step 5020 (FIG. 5) involves the step of implementing an identifying information such as a tally for identifying at least one of a: all word elements involved or belonging to said association and all word elements not involved or belonging to any association. For example, in this step, a tally (an identifying information) is used to identify all and every word element involved and/or belonging to the association and/or alternatively a tally may also be used for identifying all those other word elements not involved or experiencing any type of association. In such fashion, the word elements experiencing associations can be differentiated from those not experiencing any form of associations. The next or Third Step 5030 (FIG. 5) involves the step of identifying the number of word elements identified by said identifying information such as tally. For example, this step implies the step of counting the word elements that were tallied, thus identifying the number of associated and/or non-associated word elements on the data corpus. Noteworthy, if a word element is part of two different associations, this word element will be tallied several times (one for every association). However, the purpose of this step is not to identify how many times does the word element was tallied but rather the word elements that were tallied. Finally, the final or Fourth Step 5040 (FIG. 5) involves the obvious step of implementing said identified number for identifying at least one of a said: number of word elements involved in a association and number of word elements not involved in any association implementing said counted identifying information such as tally number. For example, this obvious step involves the step of using, registering or implementing the count or number of word elements involved in association and/or not involved in any association to identify how many word elements from the total word elements of the data corpus form part (or not form part) belonging to associations. In such fashion, an inventory can be made of how many word elements of a data corpus belong to associations and/or how many word elements of a data corpus do not belong to any associations.

Figure 6:
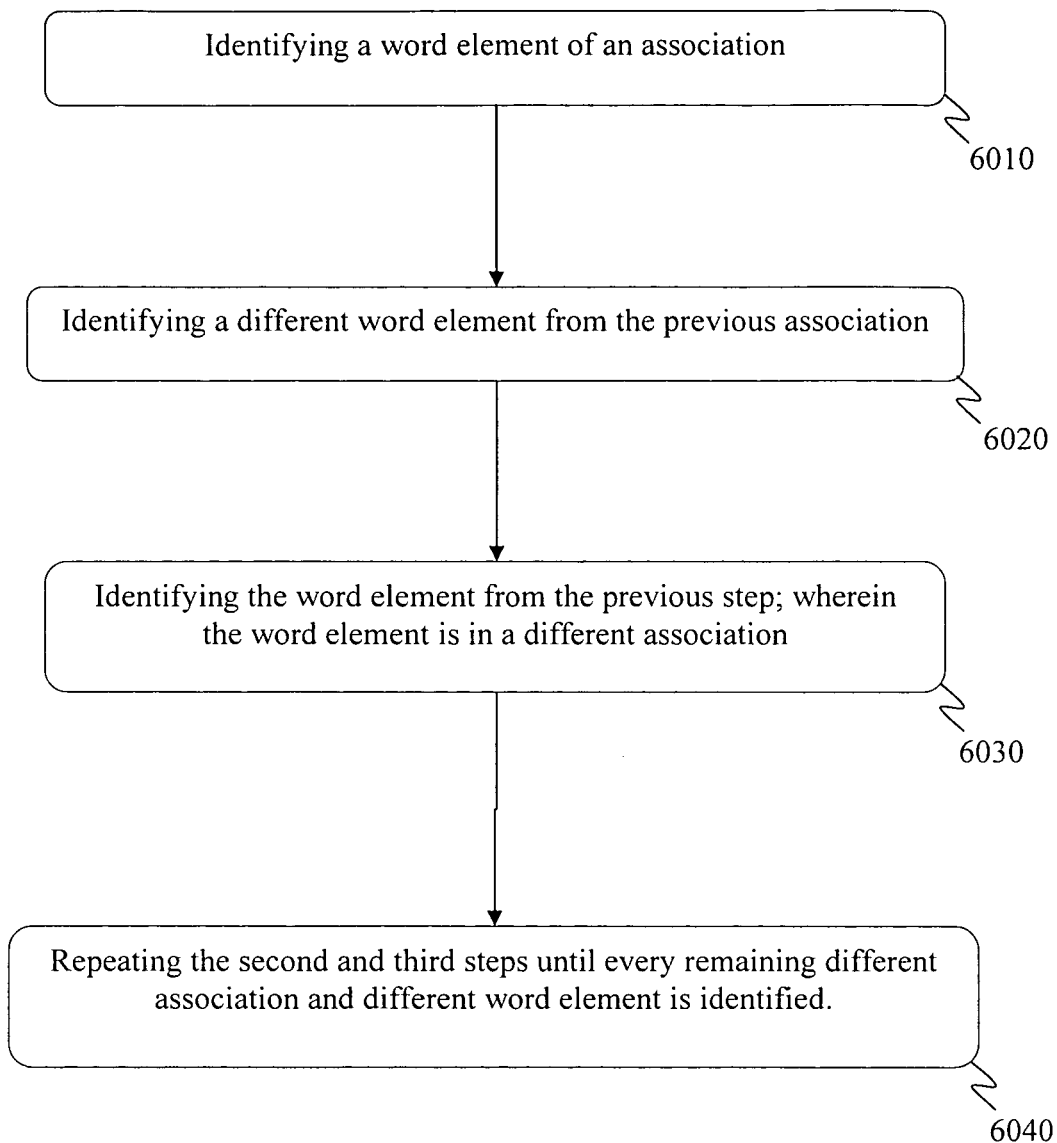
FIG. 6 is an exemplary non-limiting block diagram of the principal steps of one method depicted in FIG. 2 of the disclosed inventive method.

FIG. 6 is an exemplary non-limiting block diagram of the principal steps of one method depicted in FIG. 2 of the disclosed inventive method. The First Step 6010 (FIG. 6) involves the step of identifying a word element from an association. For example, from an association between "silly" and "Mary," the word "silly" is selected or identified. The next or Second Step 6020 (FIG. 6) involves the step of identifying a different word element from the previous association. For example, from the association mentioned in the previous step ("Mary" and "silly"), "silly" was selected, in this step, the different word of the association or "Mary" is identified or selected. The next or Third Step 6030 (FIG. 6) involves the step of identifying the element from the previous step; wherein said the word element is in different association. For example, if the word "Mary" from the previous association is also part or belongs to another association like a second association identifying "Mary" with "ran." In such fashion, the word "Mary" is used to link or bridged several associations. The Fourth Step 6040 (FIG. 6) involves the steps of repeating the Second Step and the Third Step until every remaining different association and different word element is identified. For example, in the previous steps, "Mary" was used to identify other associations and therefore other words. This step involves using the others words associated to "Mary" and their additional associations to continue identifying yet other elements through more associations. In such fashion, associations among the associations is analyzed or inspected.

Figure 7:
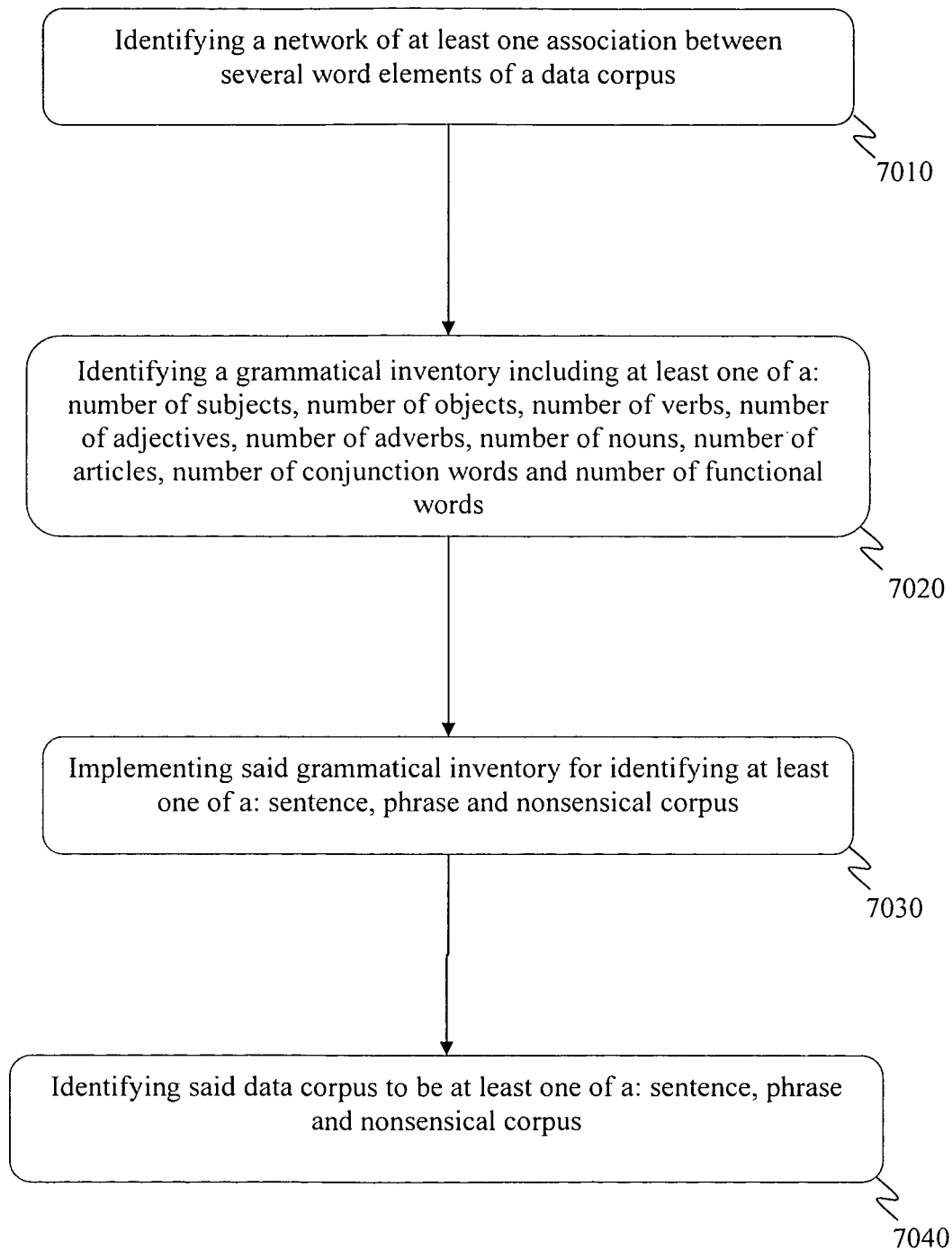
FIG. 7 is yet another variation of some of the steps of the inventive method for identifying the information identifying the grammatical classification of a data corpus.

FIG. 7 is yet another variation of some of the steps of the inventive method for identifying the information identifying the grammatical classification of a data corpus. The First Step 7010 (FIG. 7) involves the step of identifying a network of at least one association between several word elements of a data corpus. For example, identifying all the associations and/or their integrity of the word elements of a data corpus. The next or Second Step 7020 (FIG. 7) involves the step of identifying a grammatical inventory including at least one of a: number of subjects, number of objects, number of verbs, number of adjectives, number of adverbs, number of nouns, number of articles, number of conjunctions and number of functional words. For example, this step involves identifying the several numbers of word elements, specifically in a grammatical sense, involved in the associations forming a network of associations, such as counting the number of acting noun or subjects, counting the number of acting or main verbs, identifying the number or adverbial sentences or others. The Third Step 7030 (FIG. 7) involves the step of implementing said grammatical inventory for identifying at least one of a: sentence, phrase and nonsensical corpus. For example, in this step the presence or existence of the grammatical essence of the word elements could be used to determine if a data corpus is indeed a sentence, a phrase or other. In the English language, for a data corpus to be considered a sentence it requires that the data corpus has a subject and a verb involving said subject. Other languages may require different combinations of word elements to be considered a sentence or complete sentence per se. The last of Fourth Step 7040 (FIG. 7) involves the obvious step of identifying said data corps to be at least one of a: sentence, phrase and nonsensical corpus. For example, once it has been determined that a data corpus has all the elements and association to be considered a phrase instead of a sentence, then identifying the analyzed data corpus as a phrase. In similar fashion, if the corpus lacks the required element to be considered a phrase or a sentence, then identified the analyzed data corpus as a nonsensical corpus per se.

Noteworthy, there are levels and types of information integrities and coherences that can be desired or envisioned. In addition, there is a large myriad of word elements and a tremendously large quantity of different types of associations and number of word elements being associated, thus leading to possibly hundreds of other figures and corresponding detailed descriptions yet without ever departing from the main spirit and scope of the disclosed inventive method. Consequentially, to ease and facilitate the illustrations, description and teaching of the inventive method, the disclosed figures are assumed or expected to suffice the description of the main steps and enablements of the inventive method.

The enablements described in detail above are considered novel over the prior art of record and are considered critical to the operation of at least one aspect of an apparatus and its method of use and to the achievement of the above described objectives. The words used in this specification to describe the instant embodiments are to be understood not only in the sense of their commonly defined meanings, but to include by special definition in this specification: structure, material or acts beyond the scope of the commonly defined meanings. Thus if an element can be understood in the context of this specification as including more than one meaning, then its use must be understood as being generic to all possible meanings supported by the specification and by the word or words describing the element.

The definitions of the words or drawing elements described herein are meant to include not only the combination of elements which are literally set forth, but all equivalent structure, material or acts for performing substantially the same function in substantially the same way to obtain substantially the same result. In this sense it is therefore contemplated that an equivalent substitution of two or more elements may be made for any one of the elements described and its various embodiments or that a single element may be substituted for two or more elements in a claim.

Changes from the claimed subject matter as viewed by a person with ordinary skill in the art, now known or later devised, are expressly contemplated as being equivalents within the scope intended and its various embodiments. Therefore, obvious substitutions now or later known to one with ordinary skill in the art are defined to be within the scope of the defined elements. This disclosure is thus meant to be understood to include what is specifically illustrated and described above, what is conceptually equivalent, what can be obviously substituted, and also what incorporates the essential ideas.

The scope of this description is to be interpreted only in conjunction with the appended claims and it is made clear, here, that each named inventor believes that the claimed subject matter is what is intended to be patented.

CONCLUSION

From the foregoing, a series of novel methods for identifying the integrity of a data corpus can be appreciated. The described methods overcomes the limitations encountered by current information technologies such as search engines, speech recognition, word processors, and others which fail to identify the integrity of a data corpus; which potentially leads to the use of implementing keywords and randomly isolated words responsible for generating irrelevant data, irrational data and user confusion. The described inventive methods allow current and future information technologies to properly and effectively identify the integrity of information while acknowledging said integrity to users thus enforcing better communications and language between users and machines and applications.

The invention claimed is:

1. A method of determining integrity of a data string consisting of a plurality of n word elements, the method comprising:
   a) using a first word element of the n word elements, determining if the first word element may be associated with any of the remaining n−1 word elements that follow using a conceptual associative protocol;
   b) for each of the remaining n−1 word elements that follow that may be associated with the first word element using the conceptual associative protocol, forming an association consisting of the first word element in a first position of the association and the corresponding word element of the remaining n−1 word elements in a second position of the association;
   c) repeating steps a) and b) with each and every one of the remaining n−1 word elements;
   d) storing the associations formed in steps a) through c) in an association table; and
   e) performing an integrity analysis of the associations stored in the association table by determining if each and every word element of the n word elements matches at least one other word element of an association of the association table.

2. The method of determining integrity of a data string consisting of a plurality of n word elements of claim 1, wherein the data string consists of one of the following: a sentence, a plurality of sentences, a phrase, a plurality of phrases, and a string of m words, where m is any number three or greater.

3. The method of determining integrity of a data string consisting of a plurality of n word elements of claim 2, where the step of performing an integrity analysis further comprises the steps of:
   f) using the first word element of the n word elements, determining if the first word element is present in the association table by comparing the first word element with each word element of the an association table until a match is made or the end of the association table is reached;
   g) if a match is made in step f), repeat step f) using each and every word element of the remaining n−1 word elements;
   h) if the end of the association table is reached in step f), identifying the data string as not conceptually correct or coherent and terminating the method; and
   i) if all word elements of the n word elements have been associated with another word element, determining if all of the associations of the association table form, through the associations, a single continuous network that includes each and every word element of the n word elements.

4. The method of determining integrity of a data string consisting of a plurality of n word elements of claim 3, where the step of determining if the associations of the association table form, through the associations, a single continuous network, further comprises the steps of:
   j) identifying the word element in the first position and the word element in the second position of the first association of the association table as "tallied";
   k) using the word element in the second position of the first association of the association table, matching the same word element in a first position of another association of the association table and identifying the word element in the second position of the matching association of the association table as "tallied";
   l) using the word element in the second position of the matching association of the association table, repeat step k) until there are no further matches made between the word element in the second position of an association of the association table and the word element in the first position of an association of the association table;
   m) determining if all word elements of the data string are identified as "tallied"; and
   n) if all word elements of the data string are identified as "tallied," identifying the integrity of the data string as conceptually correct and coherent and terminating the method.

5. The method of determining integrity of a data string consisting of a plurality of n words of claim 1, wherein the conceptual associative protocol comprises grammatical rules.

6. The method of determining integrity of a data string consisting of a plurality of n word elements of claim 5, wherein the data string consists of one of the following: a sentence, a plurality of sentences, a phrase, a plurality of phrases, and a string of m words, where m is any number three or greater.

7. The method of determining integrity of a data string consisting of a plurality of n word elements of claim 6, where the step of performing an integrity analysis further comprises the steps of:
   f) using the first word element of the n word elements, determining if the first word element is present in the association table by comparing the first word element with each word element of the an association table until a match is made or the end of the association table is reached;
   g) if a match is made in step f), repeat step f) using each and every word element of the remaining n−1 word elements;
   h) if the end of the association table is reached in step f), identifying the data string as not conceptually correct or coherent and terminating the method; and
   i) if all word elements of the n word elements have been associated with another word element, determining if all of the associations of the association table form, through the associations, a single continuous network that includes each and every word element of the n word elements.

8. The method of determining integrity of a data string consisting of a plurality of n word elements of claim 7, where the step of determining if the associations of the association table form, through the associations, a single continuous network, further comprises the steps of:
  j) identifying the word element in the first position and the word element in the second position of the first association of the association table as "tallied";
  k) using the word element in the second position of the first association of the association table, matching the same word element in a first position of another association of the association table and identifying the word element in the second position of the matching association of the association table as "tallied";
  l) using the word element in the second position of the matching association of the association table, repeat step k) until there are no further matches made between the word element in the second position of an association of the association table and the word element in the first position of an association of the association table;
  m) determining if all word elements of the data string are identified as "tallied"; and
  n) if all word elements of the data string are identified as "tallied," identifying the integrity of the data string as grammatically correct and coherent and terminating the method.

* * * * *